United States Patent
Jung et al.

(10) Patent No.: US 11,279,090 B2
(45) Date of Patent: Mar. 22, 2022

(54) 3D-PRINTING DEVICE AND METHOD

(71) Applicant: EOS GmbH Electro Optical Systems, Krailling (DE)

(72) Inventors: Frank Jung, Gauting (DE); Alexander Prillwitz, Munich (DE); Stephan Tenbrink, Munich (DE); Stefan Paternoster, Andechs (DE); Stefan Gruenberger, Munich (DE); Frank Mueller, Munich (DE); Florian Otzmann, Munich (DE); Lena Doehl, Iffeldorf (DE)

(73) Assignee: EOS GmbH Electro Optical Systems, Krailling (DE)

( * ) Notice: Subject to any disclaimer, the term of this patent is extended or adjusted under 35 U.S.C. 154(b) by 391 days.

(21) Appl. No.: 16/183,959

(22) Filed: Nov. 8, 2018

(65) Prior Publication Data
US 2019/0143601 A1 May 16, 2019

(30) Foreign Application Priority Data

Nov. 13, 2017 (DE) .......................... 102017126665.8

(51) Int. Cl.
*B29C 64/357* (2017.01)
*B29C 64/259* (2017.01)
(Continued)

(52) U.S. Cl.
CPC .......... *B29C 64/357* (2017.08); *B29C 64/153* (2017.08); *B29C 64/165* (2017.08);
(Continued)

(58) Field of Classification Search
CPC ........................... B29C 64/153; B29C 64/357
See application file for complete search history.

(56) References Cited

U.S. PATENT DOCUMENTS

| 6,824,714 B1 | 11/2004 | Tuerck et al. |
| 8,550,802 B2 | 10/2013 | Fuwa et al. |
| (Continued) | | |

FOREIGN PATENT DOCUMENTS

| DE | 102009029765 | 12/2010 |
| DE | 102013009875 | 12/2014 |
| (Continued) | | |

OTHER PUBLICATIONS

European Search Report for Application No. 18203787.9 dated Mar. 27, 2019, 7 pages.

*Primary Examiner* — Matthew J Daniels
*Assistant Examiner* — Paul Spiel
(74) *Attorney, Agent, or Firm* — Seyfarth Shaw LLP (57) ABSTRACT

A device for producing three-dimensional components of a powdery powder material by layered application of the powder material and partial solidification of the powder material of a layer by selectively irradiating points of the layer corresponding to a cross section of the component to be produced by means of at least one energy beam. The device includes a construction container for accommodating the powder material, a coating device for the layered application of the powder material, an overflow container for accommodating an unused material residue of a production process, and an intermediate container for accommodating the unused material residue of an application process and furthermore for delivery to the overflow container.

19 Claims, 6 Drawing Sheets

(51) Int. Cl.
  *B33Y 10/00* (2015.01)
  *B33Y 30/00* (2015.01)
  *B33Y 40/00* (2020.01)
  *B29C 64/153* (2017.01)
  *B29C 64/255* (2017.01)
  *B29C 64/165* (2017.01)

(52) U.S. Cl.
  CPC .......... *B29C 64/255* (2017.08); *B29C 64/259* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 10,967,568 | B2 | 4/2021 | Walrand |
| 2007/0193858 | A1* | 8/2007 | Hillstrom ............... B65G 27/12 198/752.1 |
| 2010/0272519 | A1* | 10/2010 | Ederer ................... B33Y 40/00 406/154 |
| 2015/0290671 | A1* | 10/2015 | Jakimov ................. B22F 12/00 427/180 |
| 2016/0214173 | A1 | 7/2016 | Fisser |
| 2017/0050386 | A1 | 2/2017 | Houben et al. |
| 2019/0001413 | A1 | 1/2019 | Golz et al. |

FOREIGN PATENT DOCUMENTS

| | | |
|---|---|---|
| DE | 102015201425 | 4/2016 |
| DE | 102016105094 | 9/2017 |
| EP | 1194281 | 3/2001 |
| EP | 2281677 | 2/2011 |
| EP | 2929961 | 10/2015 |
| WO | 9828124 | 7/1998 |
| WO | 2015025171 | 2/2015 |
| WO | 2017084781 | 5/2017 |
| WO | 2017108868 | 6/2017 |
| WO | 2017157567 | 9/2017 |

* cited by examiner

3D-PRINTING DEVICE AND METHOD

TECHNICAL FIELD OF THE INVENTION

The invention relates to a device for producing three-dimensional components of a powder material by layered application of the powder material and at least partial solidification of the powder material of a layer by selectively irradiating points of the layer corresponding to a cross section of the component to be produced by means of at least one energy beam, for example an electron or laser beam, comprising a construction container or interchangeable frame, respectively, for accommodating the powder material, comprising a coating device for the layered application of the powder material and comprising at least one overflow container for accommodating an unused material residue of the powder material of a production process. Depending on the mode of operation of the coating device, namely a layer construction in only one operating direction or in two opposite directions, the device can comprise one or two overflow containers. They are in each case located downstream from the construction container in the operating direction of the coating device. The invention also relates to a production method of three-dimensional components of a powder material in the above device.

BACKGROUND OF THE INVENTION

In the case of the additive manufacturing, commonly also known as "3D printing", three-dimensional components are produced on the basis of computer-generated control commands A particularly prominent example for additive manufacturing is known under the name "selective laser sintering or laser melting, respectively". A thin layer of a routinely powder material, which, in each of its layers, is selectively solidified by selectively irradiating points corresponding to a cross section of the component to be produced, by means of a laser beam, is thereby repeatedly applied. On principle, this takes place under protective gas atmosphere and at temperatures of approximately 50° C., routinely of around 100° C., or also several 100° C. as process atmosphere.

SUMMARY OF THE INVENTION

It is an object of the present invention to design the additive manufacturing of three-dimensional components of a powder material more cost-efficiently.

In the case of the above-mentioned device, this object is solved according to the invention by means of an intermediate container for accommodating the unused material residue of the powder material of an application or coating process and furthermore for delivery to the overflow container. Depending on the mode of operation of the coating device, which has already been mentioned above, the device can comprise one, two or a plurality of overflow containers and likewise one, two or a plurality of intermediate containers. For the sake of simplicity, only one intermediate container and one overflow container will be assumed below, whereby the arrangement of a plurality of intermediate containers and a plurality of overflow containers shall on principle analogously be comprised as well.

The unused material residue is that portion of the powder material of an application process, which is not used to create a layer on a preceding layer or the bottom of the construction container or on a construction platform, respectively, in the construction container. It is in fact guided in front of the coating device as excess material or as reserve, respectively, for reliably preventing a deficit of powder material and is discharged from the construction container at the end of the application process.

The intermediate container accommodates the unused material residue of a coating process or of a few coating processes, if applicable, but at least only a partial amount of the material residue, which accrues during the entire production process of the component to be produced. The intermediate container subsequently delivers the material residue to the overflow container, so as to be available again in an at least partially emptied manner for accommodating a material residue again. The dimensions of the intermediate container can thus be smaller than those of the overflow container. This is so, because the latter has to accommodate the unused material residue of an entire production process with a plurality of application processes until the completion of one or a plurality of components to be manufactured.

The invention thus turns away from catching the material residue of each coating process in a large overflow container, which is arranged next to the or at least in the immediate vicinity to the construction container and which can interfere at that location in response to maintenance work on the construction container. The invention does in fact pursue the principle of initially only accommodating partial amounts of the material residue, which accrues as a whole, in an intermediate container, which, with respect to the technical process, is arranged close to the construction container, and of subsequently emptying the intermediate container into the overflow container, which can be positioned at a distance from the construction container. It is thus possible to remove the material residue of a coating process more quickly from the immediate surroundings of the construction container, which is generally subjected to high temperatures. The quicker the powdery material residue can be removed from the area of high temperatures, the smaller its heat-related material damages or impact can be—for example in the case of plastic-based powders as powder material, which make it unusable for being used as powder material again. The removal thereof from the construction container thus serves its high degree of recycling, whereby the operation of the device can become cheaper.

Only a small intermediate container instead of the large overflow container thus needs to be arranged in the immediate vicinity of the construction container. The device thus also gains installation space in the area of the construction container, which can be beneficial for equipment, such as heating, heat insulation or the like. The overflow container can also be arranged at a location inside the device, which for example provides for a more comfortable emptying thereof or which impedes a removal of the construction container from the device less or not at all.

Further particularly advantageous embodiments and further developments of the invention follow from the dependent claims as well as from the description below, whereby the patent claims of a certain category can also be further developed according to the dependent claims of another category, and features of various exemplary embodiments can be combined into new exemplary embodiments.

The intermediate container is emptied into the overflow container. On principle, the material residue from the intermediate container can be removed in any directions between a purely horizontal and a purely vertical direction. The quickest possible discharge from the intermediate container can be attained by using the force of gravity acting on the material residue and thus in substantially vertical direction, whereby a dwell time of the material residue inside the intermediate container is very short. According to an advantageous embodiment of the invention, the removal of the material residue can take place by means of a trough-shaped embodiment and inclined arrangement of the bottom of the intermediate container in the direction of the overflow container. The emptying of the intermediate container can thus take place driven by the force of gravity out of the intermediate container into the overflow container either directly or indirectly via further troughs or pipes.

The bottom of the intermediate container can have only a single incline, whereby a delivery of the intermediate container can for example be located in the area of a corner of the routinely rectangular construction container. In the alternative, the bottom can have two sections of identical or different incline, which are inclined towards one another, whereby the intermediate container obtains a funnel-like shape. A conveying path of parts of the material residue can thus shorten. In the case of identical incline, a delivery of the intermediate container can then be arranged in the center with respect to a side of the construction container, and eccentrically in the case of a different incline. The use of the force of gravity as conveying force of the material residue provides for a particularly simple and robust construction for the emptying of the intermediate container, which can manage without moving parts and drives, which require maintenance.

According to an alternative embodiment of the invention, the device can comprise a trough-shaped, but not necessarily inclined intermediate container, and a transport device, which acts in the intermediate container. It is to have the largest possible accommodating or feeding surface for the powdery material residue, which is routinely pushed into the intermediate container on the entire width of the construction container. A transport device acting in the longitudinal direction thereof can be supported by an incline of the intermediate container. However, it can also make the incline thereof superfluous, which can provide installation space advantages. In any event, the transport device can ensure a quick and reliable removal of the material residue from the intermediate container and thus possibly into a region of lower temperature inside the device.

The transport device can be arranged as separate aggregate in the intermediate container. In the alternative, the intermediate container itself can be part of the transport device, for example when it is embodied as oscillating conveyor. For this purpose, the intermediate container can at least be a part of a trough of an oscillating or impact trough conveyor or of a rocking conveyor, wherein the material residue is moved by means of friction or by being thrown so as to slide on the intermediate container, which is set into periodic back and forth movements, or in small jumps. Oscillating conveyors are on principle also suitable for hot goods and are characterized by a simple design, because the conveyor only comprises the intermediate container as trough or chute, respectively, on its conveying path, without highly-wearing parts. The drive of the oscillating conveyor can be arranged spaced apart from the construction container or from a process chamber, respectively, which is heated during operation of the device, and thus at a distance from a process atmosphere at that location.

On principle, the transport device can operate continuously or intermittently. According to a further advantageous embodiment of the invention, the device can comprise a mechanically or fluidically, in particular pneumatically driven continuous conveyor as transport device. As mechanical continuous conveyor, for example a conveyor belt or belt conveyor, respectively, comprising a rubber belt with fabric linings, a fiber belt or a steel band can form the transport device. In the alternative, a pneumatically driven continuous conveyor can improve the flowability of the powdery material residue by mixing with transport air, can effect an at least partial fluidization of the powder, or form a type of air cushion, on which the material residue can discharge. Transport air can preferably simultaneously be used as cooling of the material residue. The transport air may be used in a blowing as well as sucking manner.

According to a further advantageous embodiment of the invention, the device can comprise a screw or spiral conveyor as transport device. The latter differs from the screw conveyor by a missing screw shaft, whereby it leads to more space for accommodating the material residue in the intermediate container. Both provide a simple construction, an easy maintenance and small cross sectional dimensions. To attain the largest possible discharge width of the intermediate container in the direction of movement of the coating device, the screw or spiral conveyor, respectively, can preferably comprise two screws or coils, respectively, which are arranged in parallel and rotate in the opposite direction. The intermediate container can thus be dimensioned with twice the width of the depth, which is favorable for a loss-free accommodation of the material residue in the intermediate container after concluding a coating process.

According to a further advantageous embodiment of the invention, the device can comprise a chain conveyor as transport device, which runs in the intermediate container in the longitudinal direction thereof. Like the above-mentioned belt conveyor, it comprises a traction means, which continuously runs in a transport direction, comprising an upper and a lower run. It can be embodied as scraper conveyor or as trough chain conveyor. In contrast to the belt conveyor, both allow for a feeding of the powdery material residue onto the lower load span through the upper chain run, which runs back empty. The depth of the intermediate container can thus be used completely in an advantageous manner in particular in response to feeding the material residue to the transport device in surges. In the alternative, the chain conveyor can also be designed for a bilateral removal of the material residue, in that the upper run in the area of the intermediate sheet also becomes the load span by arranging a horizontal intermediate sheet between the upper and the lower run across a section of the longitudinal extension of the intermediate container. While the scraper conveyor transports the material residue with followers, which are fastened to a circumferential pulling chain transversely to the conveying direction, the pulling chain, together with its transverse webs and/or followers embodied thereon, runs completely in the conveying stream in the case of the trough chain conveyor. The trough chain conveyor can thus provide a particularly space-saving setup.

On principle, a continuous conveyor can also be operated intermittently. It can thus be put into operation, as soon as a material residue is delivered into the intermediate container after a coating process. As soon as the intermediate container is emptied completely, the transport device can be turned off, if applicable, when the time interval to the feeding of the next material residue of a further coating process is sufficiently long.

According to an alternative embodiment of the invention, the device can comprise an alternatingly operated conveyor as transport device. It does not convey continuously, but in individual intervals. It can thus also lend itself for an intermitting operation and for an adaptation of its conveying capacity during its operation. The intermediate container can for example have a plurality of followers, which can be moved back and forth in the conveying direction and in the opposite direction, which are located transversely in the conveying direction and so as to be rotatable by 90°. Due to the fact that they run in the conveying direction as well as in the opposite direction on the same path, the transport device requires a smaller amount of space in the intermediate container. The volume thereof can thus be dimensioned to essentially accommodate the material residue.

According to a further advantageous embodiment of an alternatingly operated conveyor, the device can comprise a conveying element as transport device, which is alternatingly moved in the intermediate container in the longitudinal direction thereof. The conveying element can extend horizontally and comprise lamellae, which protrude downwards and so as to be inclined in the conveying direction. The lamellae protrude into the material residue and push the latter in the conveying direction. In the opposite direction, the lamellae glide across the powdery material residue. In addition, the lamellae can be embodied so as to be broken through, for example in a frame-like manner. The powdery material can thus pass through the lamellae in response to a movement of the conveying element in the opposite direction, so as not to be transported. The scraper or lamella sheet as conveying element only needs to have a small installation height, whereby the installation space of the intermediate container is essentially completely available for accommodating the material residue.

According to an advantageous embodiment of the invention, the drive of the alternatingly moved conveying element can comprise a linkage, which effects the slow forward motion thereof in the conveying direction and a quick return motion in the opposite direction. The conveying capacity can thus be increased by using the inertia of the material residue. This is so, because the material residue is completely set into motion in the slowly moved conveying direction. In the quickly moved opposite direction, in contrast, the material residue remains largely unmoved as a result of its inertia.

According to a further advantageous embodiment of the invention, the drive can comprise a linkage, which lowers the alternatingly moved conveying element in the conveying direction and raises it in the opposite direction. The lamellae thus dip into the powdery material residue in the conveying direction, so as to transport it efficiently. In the opposite direction, in contrast, the lamellae lift out of the material residue, so as not to move it. The conveying element thus obtains a more balanced motion profile with the same efficiency, which causes a lower wear.

Finally the transport device can implement a combination of the above-mentioned conveying principles.

In the case of a flat embodiment of the intermediate container, the construction container according to a further advantageous embodiment of the invention can be capable of being removed from the device through the intermediate container. It is thus made possible to guide the construction container through a protective gas lock prior to its removal and to arrange the overflow container in the device at a location, which can be accessed more easily by an operator. The arrangement of the protective gas lock serves for a more cost-efficient operation of the device, the new arrangement of the overflow container at least for the more comfortable operation thereof.

According to an alternative embodiment of the invention, the intermediate container can be embodied to be capable of being displaced from an operating position into a service position, for example pivotable and/or displaceable, and the construction container can be capable of being removed from the device in a direction towards the operating position of the intermediate container. In machine downtimes, thus outside of a production process, the intermediate container can be displaced from an operating position into a service position, for example upwards into an empty space of the process chamber, so as to make room for a removal of the construction container, which would be blocked by the intermediate container in an operating position thereof. The intermediate container can thus be deeper or larger towards the bottom, respectively, than the space ratios would permit otherwise, whereby it can for example accommodate a more voluminous transport device.

According to a further advantageous embodiment of the invention, the device can comprise a temperature lock for creating a temperature difference between the intermediate container and the overflow container. Devices, such as constrictions of a passage cross section or strip curtains in the transport path between the intermediate container and the overflow container are suitable as temperature block. A heating on the other side of the construction container and of the intermediate container, which is arranged next to it, can thus be reduced. A difference between an average maximum temperature in the intermediate container and in the overflow container of at least 30° C., preferably of at least 50° C., more preferably of at least 100° C., particularly preferably of at least 200° C. can thus be reached. This is so, because the lower the temperature in particular in the overflow container, the fewer aging effects occur, such as, e.g. a material degeneration of the material residue. It can thus be reused as powder material to a larger extent.

The above-mentioned object is also solved by means of a method for producing three-dimensional components of a powder material in a device according to one of the above embodiments, which comprises the following recurring steps:
a) applying the powder material in a construction field of a layer,
b) removing an unused material residue of the powder material from the application process of step a) from the construction field,
c) partial solidification of the powder material of the layer applied in step a) by selectively irradiating points of the layer corresponding to a cross section of the component to be produced by means of an energy beam,
wherein the material residue of step b) is initially caught in an area close to the construction field prior to and/or during step c) and is subsequently guided into an area at a distance from the construction field.

After conclusion of step c), the method begins again with step a) for applying the powder material etc. in layers.

The application of the powder material in step a) can take place for example by means of a coating device, which, as displaceable beam, moves across the construction field at a distance from the construction field corresponding to the planned layer thickness, and which pushes a portion of the powder material in front of it and thereby largely consumes the portion. The removal of a material residue, which is not used in this application or coating step, respectively, in step b) can then take place comfortably by pushing into a container close to the construction field, namely running next to the routinely rectangular construction field along its side.

According to the invention, the material residue of each application process is not delivered into the final overflow container for accommodating all material residues of an entire production process, but initially into an intermediate container close to the construction field, from which it is delivered into an overflow container close to the construction field. The volume of the intermediate container is by far not designed for accommodating all material residues, which accrue during a complete production process of an object, but only for accommodating a partial amount.

In a favorable case, the material residue of only one application process according to step a) is temporarily accommodated in the intermediate container. The material residue thus obtains only a short dwell time in the intermediate container close to the construction field, before said intermediate container is emptied in the direction of the overflow container at a distance from the construction field, so as to be able to accommodate a further material residue from a following application process. The temporary accommodation of the material residue in the intermediate container, which is necessarily close to the construction field, provides for its systematic transfer into the overflow container at a distance from the construction field. Said overflow container is preferably located in an area, which is shielded with respect to the process atmosphere on the and in a vicinity of the construction field and which is thus at least not subjected to the high temperature of the construction field. The unused material residue can be collected there, without unintentionally baking as a result of the impact of the construction field temperature and/or suffering material damages.

The invention thus turns away from collecting all material residues of a complete production process close to the construction field and thus at least under the substantial impact of the construction field temperature. It does in fact pursue the principle of initially separately catching every unused material residue of an application process, to subsequently removing it as promptly as possible from the high-temperature process atmosphere of the construction field, and to bringing it into an at least cooler environment. The risk of a quality reduction of the material residue as a result of the impact of heat can thus be reduced significantly. This leads to a more economical execution of the method according to the invention, because a larger portion of the unused material residue can be used again as application material in a following production process.

BRIEF DESCRIPTION OF THE DRAWINGS

The invention will be described once again in more detail with reference to the enclosed figures by means of exemplary embodiments. Identical components in the different Figures are thereby provided with identical reference numerals.

DETAILED DESCRIPTION OF THE EMBODIMENTS

Figure 1:
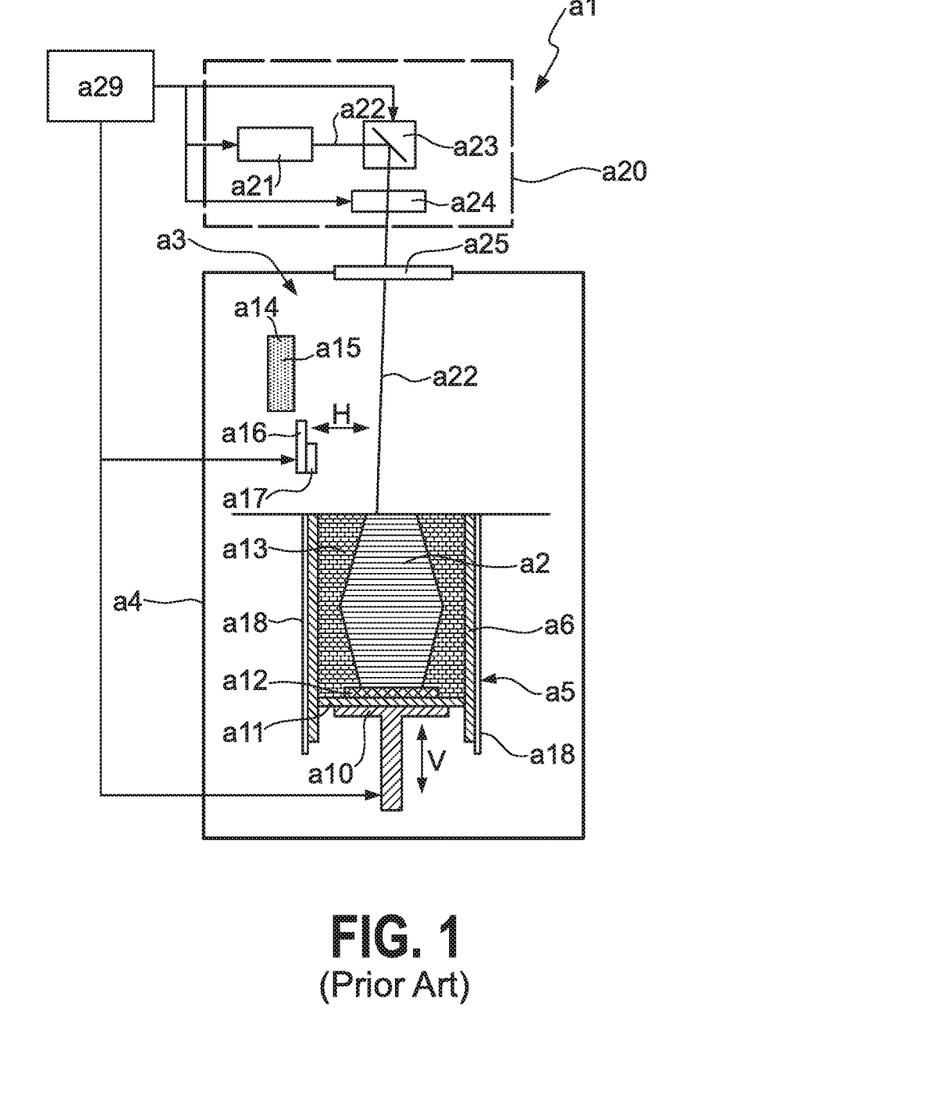
FIG. 1 shows a schematic illustration of a known laser sintering or laser melting device.

The device schematically illustrated in FIG. 1 is a laser sintering or laser melting device a1, which is known per se. To create an object a2, it includes a process chamber a3 comprising a chamber wall a4. A construction container a5, which is open to the top and comprises a wall a6 is arranged in the process chamber a3. An operating plane a7 is defined through the upper opening of the construction container 5a, wherein the area of the operating plane a7, which is located inside the opening and which can be used to create the object a2, is identified as construction field a8.

A carrier a10, which can be moved in a vertical direction V and to which a base plate a11 is attached, which closes the construction container a5 towards the bottom and thus forms the bottom thereof, is arranged in the container a5. The base plate a11 can be a plate, which is formed separately from the carrier a10 and which is fastened to the carrier a10, or it can be formed integrally with the carrier a10. Depending on the used powder and process, a construction platform a12, on which the object a2 is created, can also be attached to the base plate a11. The object a2, however, can also be created on the base plate a11 itself, which then serves as construction platform. In FIG. 1, the object a2, which is to be formed in the construction container a5 on the construction platform a12, is illustrated below the operating plane a7 in an intermediate state, comprising a plurality of solidified layers, surrounded by powder material a13, which remained unsolidified.

The laser sintering device a1 further includes a storage container a14 for a powder material a15, which can be solidified by means of electromagnetic radiation, and a coating device a16, which can be moved in a horizontal direction H, for applying the powder material a15 to the construction field a8. A scanning device a17, which is attached to the coating device a16, is further arranged in the process chamber a3.

The laser sintering device a1 further includes an exposure device a20 comprising a laser a21, which generates a laser beam a22, which is deflected via a deflecting device a23 and is focused onto the operating plane a7 by means of a focusing device a24 via a coupling window a25, which is attached to the upper side of the process chamber a3 in the wall a4 thereof.

The laser sintering device a1 further includes a control unit a29, via which the individual components of the device a1 are controlled in a coordinated manner to carry out the construction process. The control unit a29 can include a CPU, the operation of which is controlled by means of a computer program (software). The computer program can be stored separately from the device on a storage medium, from which it can be loaded into the device, in particular into the control unit.

During operation, the carrier a10 is initially lowered by a height, which corresponds to the desired layer thickness, in order to apply a powder layer. By displacing the coating device a16 across the operating plane a7, a layer of the powdery powder material a15 is then applied. To be on the safe side, the coating device a16 pushes an amount of powder material a15, which is slightly larger than what is needed for the creation of the layer, in front of it. The coating device a16 pushes the scheduled excess of powder material a15 into an overflow container a18. An overflow container a18 is in each case arranged on both sides of the construction container a5. The application of the powder material a15 takes place at least across the entire cross section of the object a2, which is to be produced, preferably across the entire construction field a8, thus the area of the operating plane a7, which can be lowered by means of a vertical movement of the carrier a10.

The cross section of the object a2 to be created is subsequently scanned by the laser beam a22, so that the powder material a15 is solidified at the points, which correspond to the cross section of the object a2 to be created.

These steps are repeated until the object a2 has been finished and can be removed from the construction space.

In response to the displacing of the coating device a16 across the operating plane a7, the scanning device a17 is displaced together with said coating device and thereby scans the operating plane a7.

Figure 2:
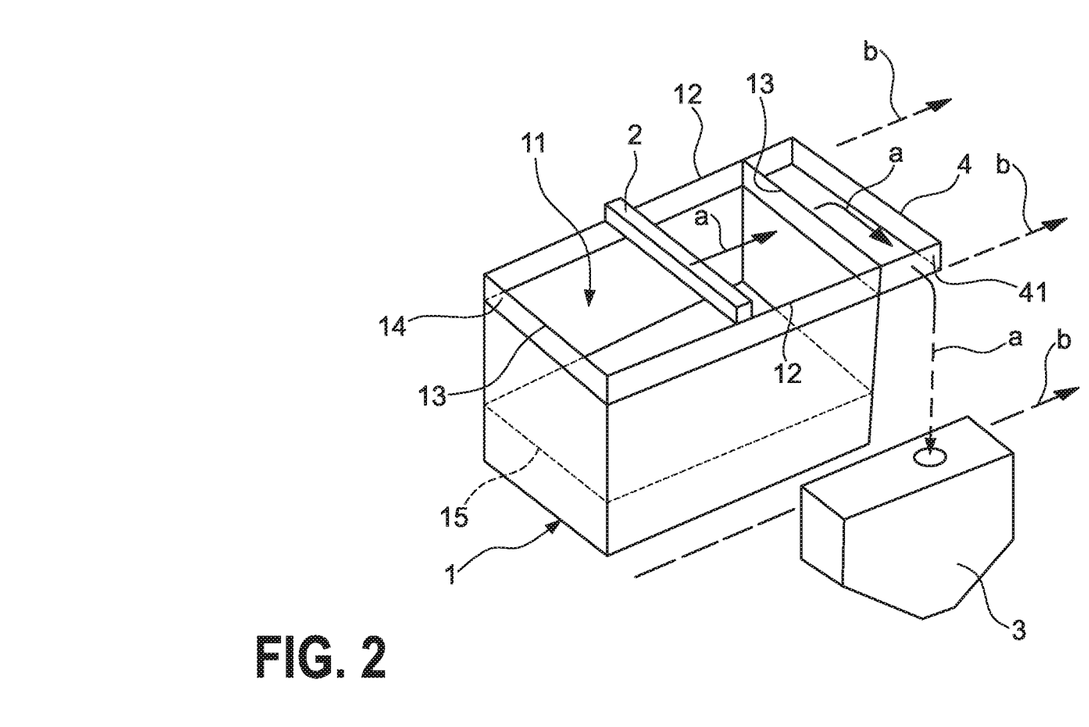
FIG. 2 shows an overview outline of essential parts of the device according to the invention.

Only components of the device for the additive manufacturing of a manufacturing product, i.e. of a three-dimensional object, which are essential for a description of the invention, are schematically outlined in FIG. 2. The device includes a cuboid construction container 1 as process chamber of the device for accommodating powder material, which is to be introduced in layers. The construction container 1 comprises a surface 11 as construction field of the device, which is surrounded by two longitudinal sides 12 and two narrow sides 13 of the construction container 1. A beam-shaped coating device 2 extends between the two longitudinal sides 12 and can be displaced back and forth horizontally in the direction of extension thereof above the construction field 11 in a frame 14 on the construction container 1.

Powder material (not illustrated) is solidified selectively in a manufacturing process, wherein the powder material is selectively irradiated with a laser beam (not shown) for solidification on the construction field 11, and an impact surface of the laser beam on the construction field 11 is moved thereby, for example according to a predetermined irradiation strategy. Powder is routinely used as powder material, which the coating device 2 creates in layer on a vertically displaceable bottom 15 of the construction container 1. The coating device 2 distributes the powder across the construction field 11 to the right narrow side 13 thereof in the direction of an arrow a, starting on the left narrow side 13. A portion of the powder of a freshly created layer is in each case solidified with the help of the laser beam. Temperature of around 300° C. prevail in the construction field 11.

The coating device 2 pushes unused powder material or powder, respectively, beyond the right narrow side 13 in the direction of the arrow a at the end of an application process into a trough-shaped intermediate container 4 with a rectangular cross section. The latter is thus located directly next to the construction container 1 and thus in the impact area of the high temperatures prevailing there. The intermediate container 4 extends at least across the entire width of the construction container 1 on the right narrow side 13 thereof. Its volume corresponds to that of a material residue of a coating process, plus a safety margin. It is embodied to be as flat as possible. Its width transversely to its longitudinal extension is oriented on a trajectory parabola or a flight curve, respectively, of the material residue discharged horizontally at relatively high speed.

The intermediate container 4 is open on its narrow side 41, which is located parallel to the front longitudinal side 12 of the construction container 1. The material residue is conveyed across said narrow side into an overflow container 3, according to arrow a. Its volume is designed towards the accommodation of the material residues of all coating processes of a complete production process. It is located in an area of the device, in which lower ambient temperatures prevail, whereby damages for example of polymer powder as powder material is at least reduced and the reuse of the material residue is thus improved. In addition, the overflow container can now be accommodated at a location of the device, which can be accessed particularly easily by an user Finally, the construction container 1 can now possibly also be removed from the device underneath the intermediate container 4 in a removal direction b.

Figure 3:
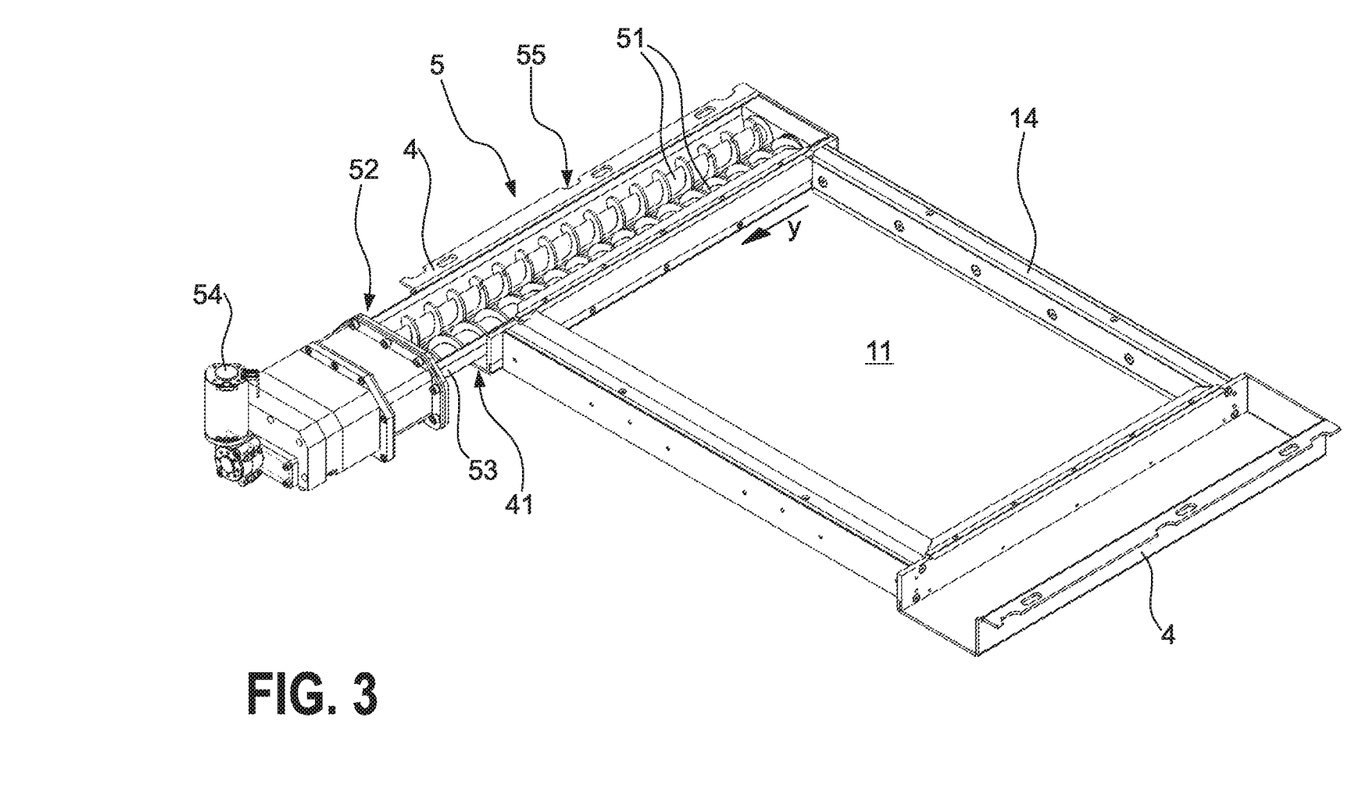
FIG. 3 shows a screw conveyor.

The flat construction of the intermediate container 4 requires a motor-driven transport of the material residue in the longitudinal direction of the intermediate container 4 in the direction of the narrow side 41. FIG. 3 shows a screw conveyor 5 as a first embodiment of a transport device in one of two intermediate containers 4, which are located opposite one another on the frame 14, which surrounds the construction field 11. The front intermediate container 4 is illustrated without screw conveyor, but also needs one. The transport device comprises a double screw comprising two conveyor screws 51, which are driven in opposite direction and which engage with one another and which are located largely flush in the rear intermediate container 4 on the upper side and protrude beyond the narrow side 41 thereof. A covered delivery for the powdery material residue, which is directed downwards, is located in the area of its projection 52 on the bottom side. The screws 51 are located in a trough 53, the cross section of which corresponds to the shape of the lower case omega, so that every screw 51 is located in a shell, which has a semicircular or U-shaped cross section. The trough 53 closely matches the conveying screws 51 and thus prevents the powdery material residue from escaping and remaining in the trough 53. In extension of the protrusion 52, an electric motor 54 together with transfer gearbox is attached as drive of the conveying screws 51.

The screw conveyor 5 offers a large feeding or access surface 55, respectively, which largely corresponds to the complete length and width of the intermediate container 4 and utilizes the depth thereof, which is small in comparison. The screw conveyor 5 thus offers a constructively simple construction, easy maintenance and good installation space utilization.

Figure 4:
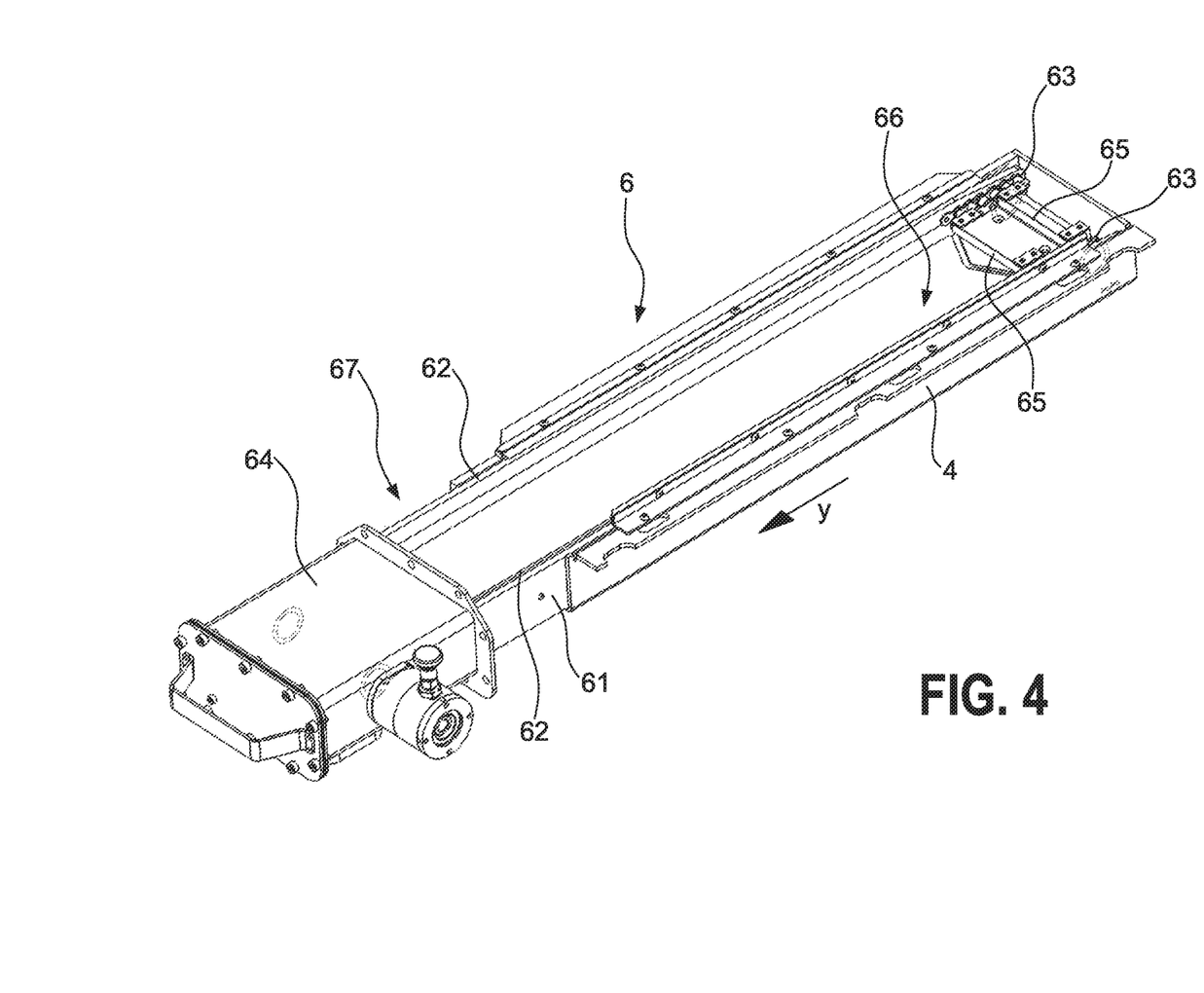
FIG. 4 shows a chain conveyor.

FIG. 4 shows a chain conveyor as alternative embodiment of a transport device. On the upper side, it is located largely flush in the intermediate container 4, which can on principle be arranged as in FIG. 1 or 2. The chain conveyor 6 consists of a trough 61, which protrudes across the open narrow side 41 of the intermediate container 4 and which, on its longitudinal edges 62, guides two parallel circumferential chains 63, which are suggested only in sections, and of an electromotive drive 64. Rib-shaped followers 65, which run transversely and which pull the chains 63 in the longitudinal direction through the intermediate container 4, are mounted between the chain 63. Sufficient space remains between the followers 65, so that the powdery material residue can fall through an upper empty run 66 of the chain conveyor 6 into the trough 61. There, it is conveyed by the followers 65 of the lower load span (not illustrated) to the narrow side 41 and shortly behind it in a protrusion into a bottom-side delivery (not illustrated) in the direction of the overflow container 3 (only FIG. 2). The followers 65 can protrude outwards or can be directed inwards in a space between the upper and the lower run in the manner of a trough chain conveyor. With the same construction height or depth, respectively, of the intermediate container 4, different deflection radii of the chains 63 result and a more intensive contact of the material residue with the chains 63 in the second case.

Figure 5:
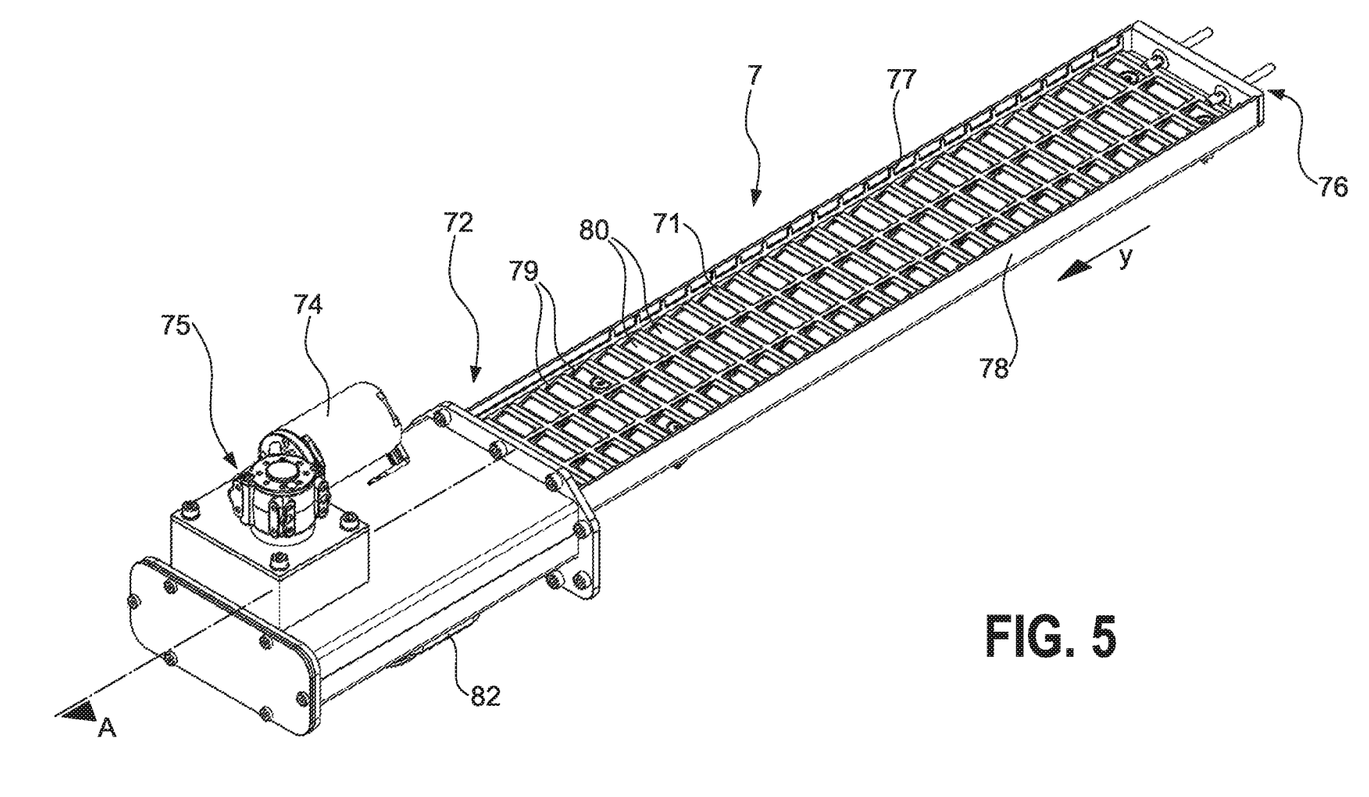
FIG. 5 shows an alternatingly driven conveyor element.
Figure 6:
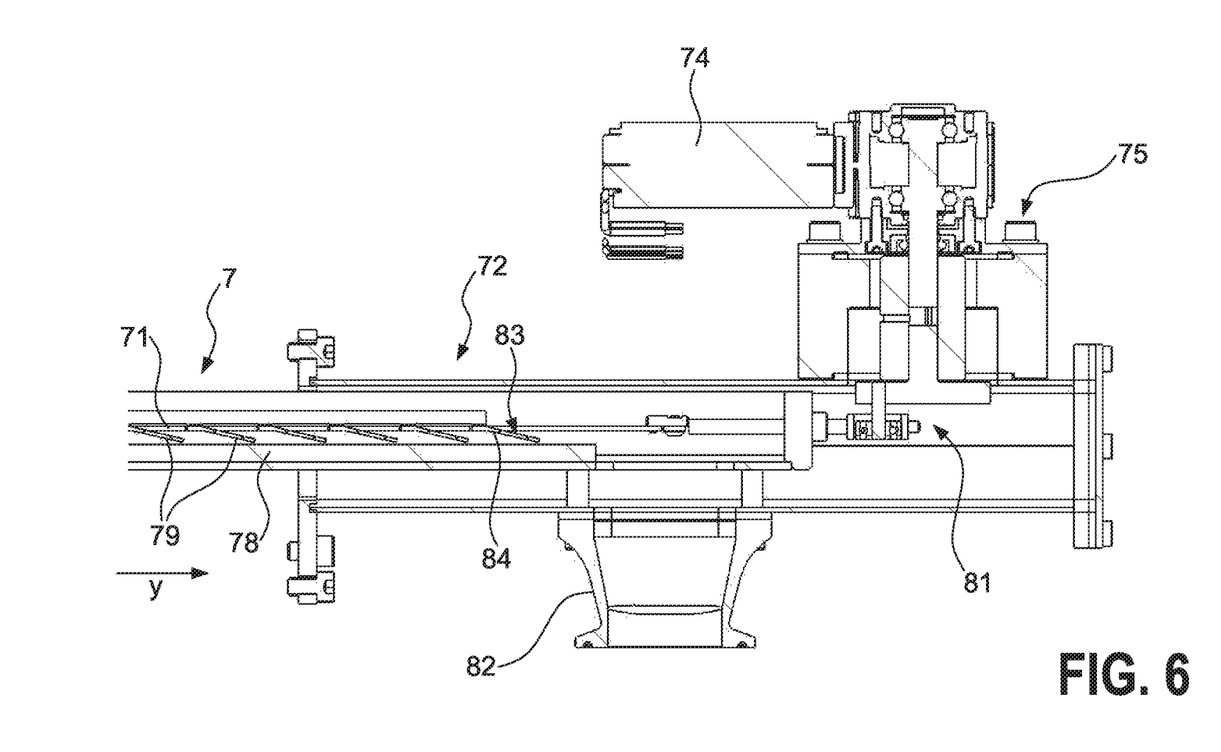
FIG. 6 shows a sectional view according to the sectional line A-A in FIG. 5.

FIGS. 3 and 4 relate to continuous conveyors. FIGS. 5 and 6 show a transport device 7 comprising an alternatingly driven flat conveying element 71. It is illustrated without the intermediate container 4 of FIGS. 2 to 4, but is dimensioned comparably with FIGS. 3 and 4 with regard to a protrusion 72 with respect thereto. A delivery 82 for the powdery material residue is arranged on the bottom side in the protrusion 72. An electric motor 74 together with gear unit 75 ensures a horizontal back and forth movement in a longitudinal direction of extension of the intermediate container 4, for the purpose of which the conveying element 71 has an axle-driven linear bearing 76 on its side located opposite the motor 74, and linear slide bearings 77 on its longitudinal sides in a trough 78.

Strip-shaped lamellae, which run transversely to the direction of movement of the conveying element 71 and which are inclined in a conveying direction y of the transport device 7, protrude from the flat conveying element 71 on the bottom side, so that they offer an upper side 83 facing the motor and a bottom side 84 facing away from it (only FIG. 6). Their surfaces include rectangular apertures 80. When feeding the powdery material residue, it passes through the apertures 80 and fills the trough 78.

A crank guide drive 81, which can be seen in the sectional illustration of FIG. 6, sets the conveying element 71 into a quick, abrupt movement opposite the conveying direction y and into a slower and even movement in the conveying direction y. The lamellae 79 entrain powdery material in the trough 78 in response to their even movement in the conveying direction y and convey it by the length of a stroke of the conveying element 71. In response to the abrupt movement of the conveying element 71 in the opposite direction, in contrast, the material is pushed against the bottom sides 84 of the lamellae 79 as a result of its mass inertia. The apertures 80 make it possible that the material reaches through the lamellae 79 to the upper sides 83 thereof. The subsequent slower movement of the conveying element 71 overcomes the inertia of the material and now conveys it further in the conveying direction y and thus towards the delivery 82 by the length of a stroke.

In closing, it is pointed out once again that the devices, which are described in detail above, are only exemplary embodiments, which the person of skill in the art can modify in a variety of ways, without leaving the scope of the invention. The use of the indefinite article "a" further does not rule out that the respective features can also be present several times. The terms "unit" and "module" likewise do not rule out that they also consist of a plurality of subunits, which may also be spatially separated.

REFERENCE LIST a1 laser sintering or laser melting device
a2 object
a3 process chamber
a4 chamber wall
a5 construction container
a6 wall
a7 operating plane
a8 construction field
a10 movable carrier
a11 base plate
a12 construction platform
a13 unsolidified powder material
a14 storage container
a15 powder material
a16 coating device
a17 scanning device
a18 overflow container
a20 exposure device
a21 laser
a22 laser beam
a23 deflecting device
a24 focusing device
a25 coupling window
a29 control unit
1 construction container
2 coating device
3 overflow container
4 intermediate container
5 screw conveyor
6 chain conveyor
7 transport device
11 construction field
12 longitudinal side
13 narrow side
14 frame
15 bottom
41 narrow side
51 conveying screw
52 protrusion
53 trough
54 motor
55 feeding surface
61 trough
62 longitudinal edge
63 chain
64 motor
65 follower
66 upper run
67 protrusion
71 conveying element
72 protrusion
74 motor
75 gear unit
76 linear bearing
77 sliding bearing
78 trough
79 lamella
80 aperture
81 crank guide drive
82 delivery
83 upper side
84 bottom side
a direction of movement
b removal direction
H direction of movement
V direction of movement
y conveying direction

The invention claimed is:

1. An additive manufacturing device for producing one or more three-dimensional components from a powder material by layered application of the powder material and solidification of the powder material of a layer by selectively irradiating points of the layer corresponding to a cross section of the component to be produced by an energy beam, comprising:

a construction container having a build area;
a powder delivery supply communicating with the build area;
a coating device that deposits powder material across the build area in layered application of the powder material supplied to the build area;
an overflow container in communication with the construction container for storage of unused excess powder material from layers made in a production process;
a trough-shaped intermediate container having an opening into which the coating device deposits the unused excess powder material in the course of applying each layer; and a transport device that extends along and adjacent to a side of the build area and a motor drive communicating with the transport device to convey the unused excess powder material through the intermediate container and into the overflow container.

2. The device according to claim 1, wherein the intermediate container has an elongated interior space which is inclined from a higher end to a lower end proximate to an outlet for the unused excess powder material.

3. The device according to claim 1, wherein the transport device is a mechanical or fluidically driven continuous conveyor.

4. The device according to claim 3, wherein the conveyor is a screw conveyor or spiral conveyor.

5. The device according to claim 3, wherein the conveyor is a belt or chain conveyor.

6. The device according to claim 2, wherein the transport device is an alternatingly driven conveyor.

7. The device according to claim 6, wherein the transport device includes a conveying element disposed therein and that is alternatingly moved in the intermediate container along the elongated interior space.

8. The device according to claim 1 wherein the construction container is removably attached within the additive manufacturing device and is separable from the intermediate container.

9. An apparatus for producing a three-dimensional object from a powder material by a process of layerwise build-up of successive layers of the powder material solidified in correspondence to cross-section of the three-dimensional object by selectively irradiating, thereby fusing, respective layers to another with a source of energy in the form of a controlled beam, the apparatus comprising:
build chamber having a build area within which the three-dimensional object is generated by the process, the build area having a build surface upon which the controlled beam impinges, wherein the powder material is provided from a powder supply and applied in a layer by a spreading implement extending across the build area, wherein the spreading implement is reciprocated over the build surface to spread the powder material in the layer;
an overflow container receiving excess powder material that is in excess of the layer that has been spread;
a first intermediate container in communication with the overflow container and having an opening extending along a first side of the build area such that the excess powder material is swept into the opening by the spreading implement and into an intermediate container interior, wherein a powder conveyor is located within the intermediate container interior and extends along and adjacent to a side of the build area and includes an element, which is adapted to engage the excess powder material therein, and a drive mechanism adapted to move the element to convey the excess powder from of the intermediate container interior into the overflow container.

10. The apparatus of claim 9, wherein the build area is surrounded by a build chamber base, the first side of the building area defining a first side edge in the build chamber base, and wherein the first intermediate container is disposed in the build chamber base adjacent to and extending along the first side edge.

11. The apparatus of claim 10, further comprising a second intermediate container, wherein the building area defines a second side edge in the build chamber base along a second side opposite to the first side, and wherein the second intermediate container is disposed in the build chamber base adjacent to and extending along the second side edge.

12. An additive manufacture method for producing a three-dimensional object from a powder material by a process of layerwise build-up of successive layers of powder material solidified in correspondence to cross-section of the three-dimensional object by selectively irradiating, thereby fusing, respective layers to another with a source of energy in the form of a controlled beam, comprising:
providing build chamber having a build area within which the three-dimensional object is generated by the process, wherein the build area includes a build surface upon which the energy beam impinges;
providing the powder material from a powder supply;
reciprocating a spreading implement extending across the build area to spread the powder material in a layer over the build surface;
receiving, by an overflow container, excess powder material that is in excess of the layer that has been spread; and
sweeping, by the spreading implement, the excess powder material through an opening of an intermediate container and into an intermediate container interior in communication with the overflow container, wherein the opening extends adjacent to and along a first side of the building area;
engaging, by an element of a powder conveyor that extends along and adjacent to a side of the build area, the excess powder material in the powder conveyor; and
driving, by a drive mechanism of the powder conveyor, the element to convey powder from the intermediate container interior to the overflow container.

13. The method of claim 12, wherein the build area is surrounded by a build chamber base, wherein the first side of the build area defines a first side edge in the build chamber base, and wherein the intermediate container is disposed in the build chamber base adjacent to and extending along the first side edge.

14. The method of claim 12, wherein the intermediate container has an elongated interior space that is horizontally from a higher end to a lower end proximate to an outlet for the excess powder material.

15. The method of claim 12, wherein the powder conveyor is a mechanical or fluidically driven continuous conveyor.

16. The method of claim 12, wherein the powder conveyor is a screw conveyor or spiral conveyor.

17. The method of claim 12, wherein the powder conveyor is a belt or chain conveyor.

18. The method of claim 12, wherein the powder conveyor an alternatingly driven conveyor.

19. The method of claim 12, wherein the build chamber is disposed in a construction container that is separable from the intermediate container.

* * * * *